United States Patent

Ineson et al.

[11] Patent Number: 5,334,897
[45] Date of Patent: Aug. 2, 1994

[54] ELECTRIC MOTOR WITH ENCASED HOUSING

[75] Inventors: David J. Ineson, Oakville; Edward M. O'Connor, Middlefield; David C. Casali, Glastonbury, all of Conn.

[73] Assignee: North American Philips Corporation, New York, N.Y.

[21] Appl. No.: 66,958

[22] Filed: May 24, 1993

[51] Int. Cl.$^5$ .............................................. H02K 5/00
[52] U.S. Cl. ........................................ 310/89; 310/42; 310/43; 310/49 R; 310/71; 310/DIG. 6
[58] Field of Search ................ 310/89, 42, 43, 88, 310/71, 258, 179, 91, 49 R, DIG. 6; 29/596

[56] References Cited

U.S. PATENT DOCUMENTS

| | | | |
|---|---|---|---|
| 2,411,684 | 11/1946 | Hamilton | 310/258 |
| 3,182,216 | 5/1965 | Bancroft | 310/258 |
| 3,760,209 | 9/1973 | Hult | 310/91 |
| 4,412,146 | 10/1983 | Futterer | 310/43 |
| 4,626,724 | 12/1986 | Morishita | 310/88 |
| 4,866,317 | 9/1989 | Katayama | 310/71 |
| 5,073,735 | 12/1991 | Takagi | |
| 5,134,327 | 7/1992 | Sumi et al. | |
| 5,164,625 | 11/1992 | Hoffmann | 310/88 |
| 5,184,039 | 2/1953 | Kraft | 310/89 |

FOREIGN PATENT DOCUMENTS

| | | |
|---|---|---|
| 0519163 | 3/1992 | European Pat. Off. |
| 55-63541 | 5/1980 | Japan |
| 1351768 | 4/1971 | United Kingdom |
| 1570810 | 9/1977 | United Kingdom |

Primary Examiner—R. Skudy
Attorney, Agent, or Firm—Robert J. Kraus

[57] ABSTRACT

A sealed electric motor is formed by means of interfitting metallic housing members and an overmolded plastic casing. The housing includes an annular groove into which the casing extends to improve both retention and sealing.

31 Claims, 4 Drawing Sheets

ELECTRIC MOTOR WITH ENCASED HOUSING

BACKGROUND OF THE INVENTION

Field of the Invention

This invention relates to electric motors which are protected against environmental conditions, and in particular to such motors which must be sealed against liquid contaminants.

Description of Related Art

In some applications, electric motors are exposed to liquids which would adversely affect their operation if allowed to reach the interior electrical and mechanical components. A typical application is in automotive vehicles, where electric motors are often used to control engine functions and are continually exposed to liquids such as fluids used in the automobile itself and salt-contaminated water from the road. In such applications, the liquid seal must remain intact in a hostile environment where the sealed motor is repeatedly subjected to vibration, shock, and thermal stress.

It is desirable to enclose the motor components in a sealed housing. However, the housing must have separable parts to enable insertion of the motor components. It is difficult to form a long-lasting seal between these parts which will prevent passage into the housing of low viscosity fluids, such as water, solvents, lubricating oil, etc.

It is known to overmold motor components with a plastic material. This, however, leads to a number of difficulties. For example, it is difficult to prevent the plastic molding material (which is typically injection molded under pressure) from itself leaking into the interior of the motor. This could restrict movement of the motor's rotor or could damage other internal parts of the motor. Further, the pressure applied to the motor components during molding could force them to distort or misalign. Also, if the molding material and the motor parts onto which it is applied have different temperature coefficients of expansion, the overmolded material could separate from the motor at temperature extremes.

SUMMARY OF THE INVENTION

It is an object of the invention to provide a substantially sealed electric motor which overcomes the above-described difficulties. The motor is of the type comprising an electromechanical assembly including a stator, a plurality of windings, and a rotor electromagnetically coupled to the windings and the stator and mounted for rotation relative to the stator in response to the application of electrical current to the windings. The motor also includes a shaft, having a longitudinal axis, which is driven by the rotor and is accessible externally of the motor.

In accordance with the invention, the electromechanical assembly is enclosed in a substantially closed housing having a plurality of separable parts. The housing includes an drive portion and an adjacent body portion. The drive portion has an opening through which a length of the shaft protrudes from the housing interior for driving a load. The body portion extends and around a distal end of the electromechanical assembly. The body portion includes at least one junction between the separable parts, and each such junction is of a type which is impervious to a predetermined molding material. A casing comprising the predetermined molding material is molded over a substantial area of the body portion including each said at least one junction. At least one irregularity is formed in an outer surface of the housing, to which an inner surface of the molded casing conforms for retaining the casing on the housing.

Because of the high viscosity of virtually any molding material (in comparison to the fluids to which the motor will be exposed), it is relatively easy to seal the one or more junctions between the separable parts of the housing. The housing itself shields the internal parts of the motor against any pressures applied during overmolding of the casing. In turn, the casing covers the one or more junctions so that the liquids against which the motor is sealed cannot reach the internal parts. Preferably, the casing is molded over substantially the entire body portion. Finally, the molded conformation of the casing inner surface to the at least one irregularity in the outer surface of the housing retains the casing on the housing, even at temperature extremes, without the need for any additional retaining means.

DESCRIPTION OF THE PREFERRED EMBODIMENT

Figure 1:
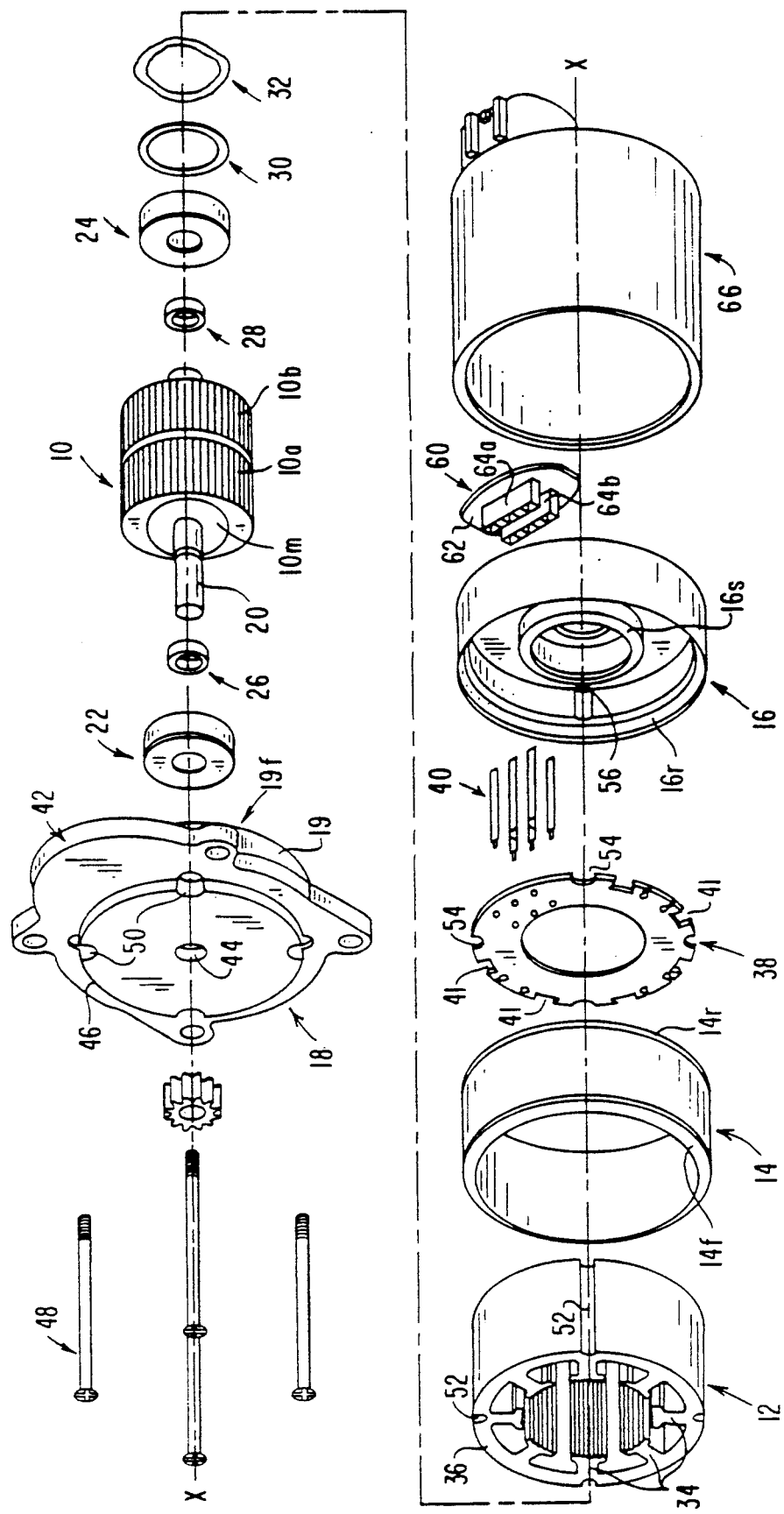
FIG. 1 is an exploded view of components of a motor in accordance with the invention.

FIG. 1 illustrates component parts of an electric motor in accordance with the invention. In an exemplary embodiment which has been built and tested the motor is a stepper motor. The motor comprises an electromechanical assembly formed from component parts which are assembled along a central longitudinal axis x—x and which include a rotor 10, a stator 12 and a number of mechanical parts for rotatably mounting the rotor within the stator. The motor also comprises a number of parts forming means for making electrical connections and a number of parts forming a housing. The completed assembly of these parts can best be understood by referring to FIGS. 1 and 2 together.

The housing parts include a cylindrical stator shroud 14 which fits tightly around the stator 12, a rear end cover 16 and a front end cover 18. The rear end cover 16 has a rim 16r which is force fitted around a lip 14r at a rear end of the stator shroud. The front end cover 18 has a rim 19f which is force fitted around a lip 14f at a front end of the stator shroud. Preferably the stator shroud is made of a magnetic material, such as cold-rolled steel, to improve magnetic coupling properties of the stator. Conveniently the front and rear end covers are made of a strong, light-weight material such as aluminum.

The rotor 10 includes a permanent magnet 10m having North and South magnetic poles at opposite axial ends. An axially-spaced pair of pole pieces 10a, 10b are securely fitted around the permanent magnet, which is itself affixed to a shaft 20.

Portions of the shaft extending from opposite ends of the rotor are rotatably mounted within respective ball bearings 22 and 24, which are in turn secured in annular seats 18s and 16s that are formed as integral portions of the front end cover 18 and the rear end cover 16, respectively. A pair of spacers 26, 28 axially position the rotor between the ball bearings, and a pair of washers 30, 32 cooperate to adjustably fill a space between an axial end of the bearing 24 and a facing surface of the rear end cover 16. Washer 30 is a flat washer, while washer 32 is a wave washer that functions as a spring acting in the axial direction.

The stator 12 comprises a plurality of pole pieces 34 which are connected to each other by an annular armature 36. As is well known in the art, the armature serves as means for magnetically coupling the pole pieces. The stator also includes a plurality of windings (not shown) around respective ones of the pole pieces for energizing the motor.

Electrical connections to the windings are made by means of a printed circuit board 38 and a plurality of conductive electrical terminals 40. The printed circuit board is attached to the stator by means of a plurality of circumferentially-spaced slots 41, which are fitted over tabs of a stator bobbin (not shown) onto which the windings around the pole pieces 34 are physically wound. The winding wires and the electrical terminals 40 are attached to the circuit board by soldering. The circuit board includes conductive tracks which electrically connect the windings to each other and to the terminals. In a preferred embodiment selected ones of the windings are electrically connected in series by the conductive tracks to decrease the number of terminals needed.

Functionally, the housing is divided into a drive portion and a body portion. The drive portion, which is formed as an integral part of the front end cover 18, includes a flange 42, which circumvents the axis x—x, and a circular opening 44 through which a length of the shaft 20 extends out of the housing. The drive portion also includes an integral circular stepped region 46 to facilitate accurate placement of the motor when it is mounted to a driven apparatus. The body portion, which extends from a rear face 42r of the flange 42 and around the distal end of the electromechanical assembly, includes a cylindrical portion 19 which terminates in the rim 19f, the cylindrical stator shroud 14, and the rear end cover 16.

Figure 2:
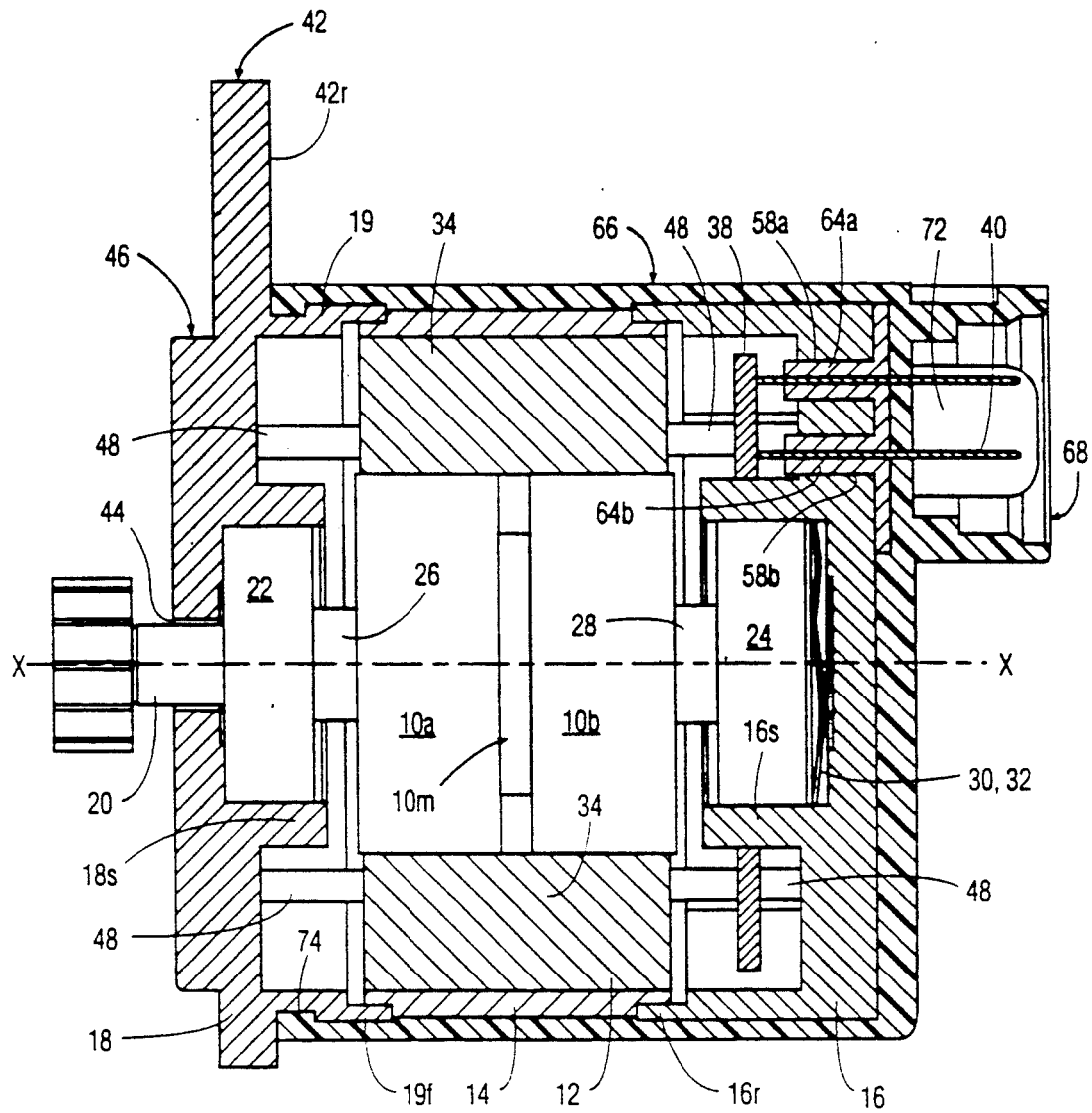
FIG. 2 is a side view, largely in cross section, of a completed motor in accordance with the invention.

The component parts of the motor are secured together by four bolts 48, of which only portions are shown in FIG. 2. The bolts pass through respective holes 50 in the front end cover 18, channels 52 in the stator 12, notches 54 in the printed circuit board 38, and finally into holes 56 in the rear end cover 16. The holes 50 are defined by tapered sidewalls for capturing correspondingly tapered heads of the bolts and the holes 56 are internally threaded to receive threaded ends of the bolts.

In order to facilitate external connection to the electrical terminals 40, which are arranged in two parallel rows in this exemplary embodiment, two corresponding slots 58a, 58b which are aligned with the rows of terminals are provided in the rear end cover 16. To close gaps between walls defining these slots and the electrical terminals themselves, a terminal barrier 60 is attached to the end cover 16 and to portions of the electrical terminals which pass through the slots. The terminal barrier, which is molded from a single piece of insulating material, includes a flat plate-shaped portion 62 from which extend two apertured plugs 64a,64b. The outer surfaces of the plugs are shaped and dimensioned to fit snugly within respective ones of the slots 58a, 58b while the apertures in the plugs are shaped and dimensioned to fit snugly around respective ones of the electrical terminals 40.

Figure 3:
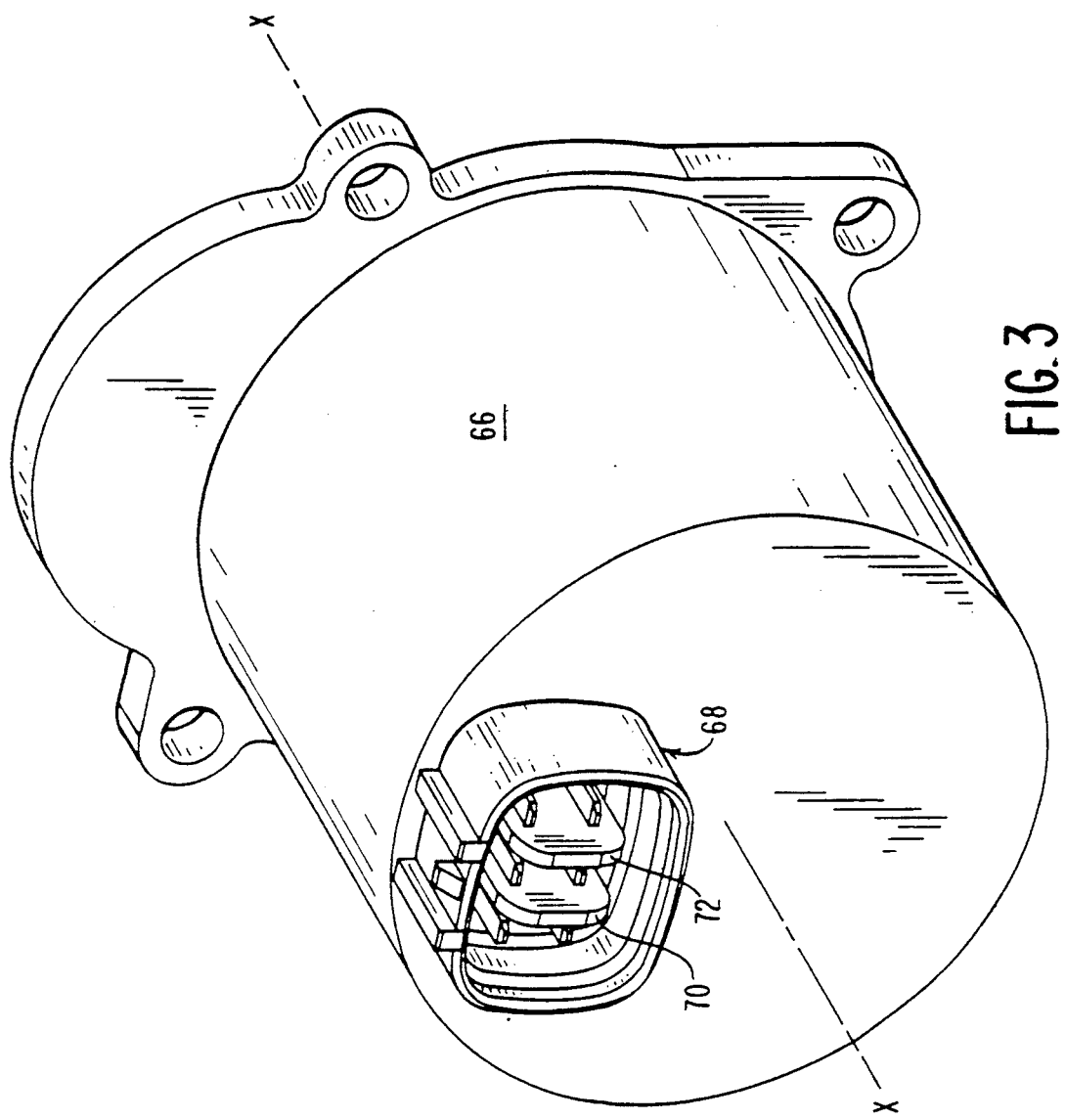
FIG. 3 is an oblique view of the motor of FIG. 2 showing an electrical connector which is integrally molded as part of a casing of the motor.

In the preferred embodiment, the entire body portion of the housing is overmolded with a plastic material to form an integral casing 66. As can be seen in FIGS. 2 and 3, the casing extends from the rear face 42r of the flange 42 and around the rear end cover 16. Thus, it completely covers all potential leakage paths, including the circumferential junction between rim 19f and lip 14f, the circumferential junction between rim 16r and lip 14r, and the terminal barrier 60. The thickness of the casing covering the terminal barrier is also molded directly around each of the electrical terminals 40. Further, a portion of the casing is molded to form an integral electrical connector 68 around portions of the terminals which extend out of the casing and to form barriers 70 and 72 between adjacent pairs of the terminals.

In order to ensure that the overmolded casing 66 is retained on the metal housing, despite the different degrees of expansion and contraction which these two bodies of different materials will undergo at different temperatures, an annular channel 74 is provided in an outer surface of the cylindrical portion 19. This channel is made sufficiently deep to ensure engagement, at all temperature extremes to which the motor will be exposed, with a corresponding portion of the casing which ultimately is molded into the groove. The channel and the casing material molded into it also form a tortuous path which hinders the passage of contaminants to the junctions between the separate parts of the housing.

Figure 4:
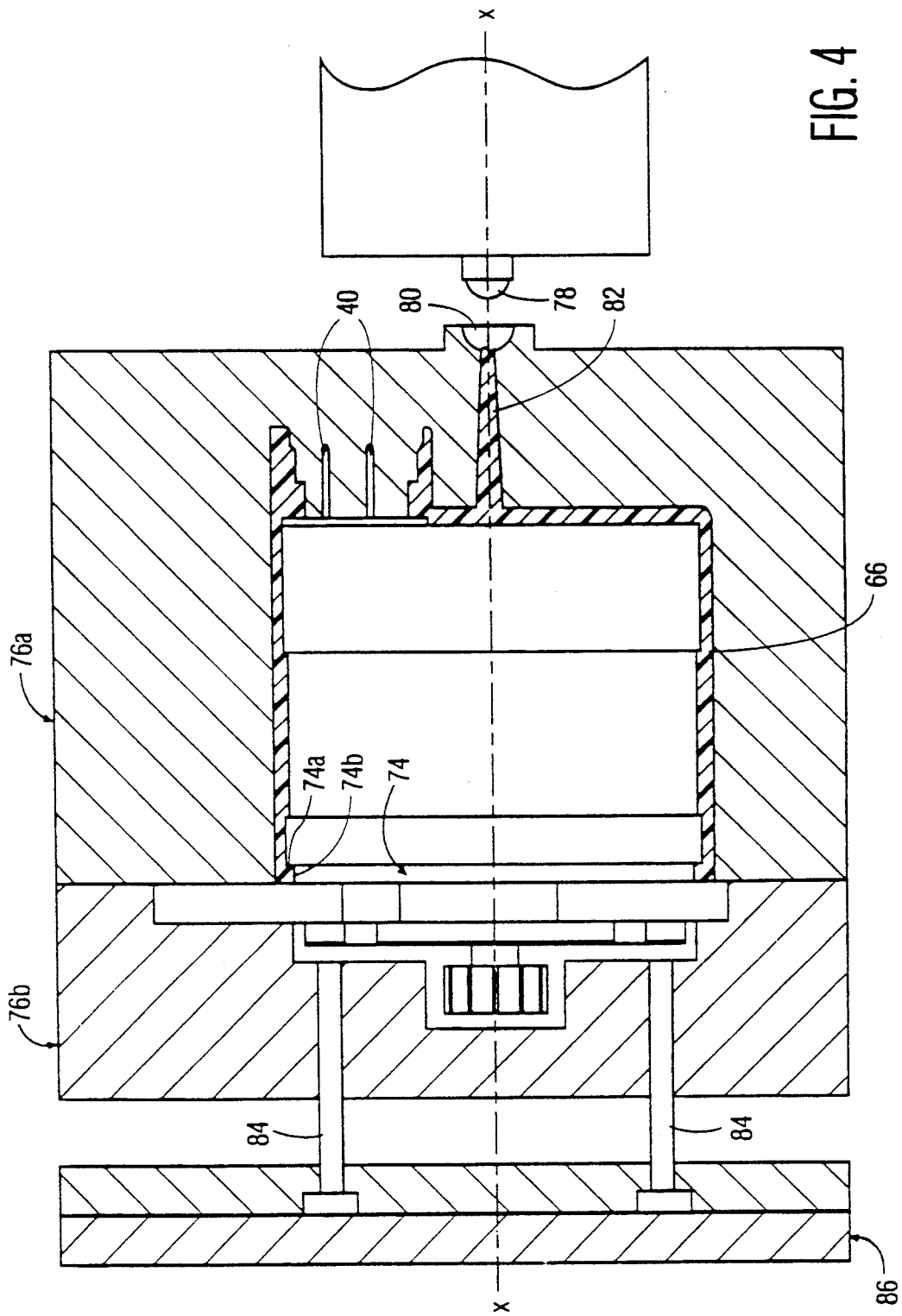
FIG. 4 is a side view, partly in cross section, illustrating injection molding of the casing onto the motor housing.

Preferably the casing 66 is injection molded over the housing of the motor, as is illustrated in FIG. 4. This FIGURE shows a mold from which the front half has been cut away to reveal a motor that has been overmolded. The rear half of the mold and the molding material in this half are shown in section. The motor is shown in a full side view.

The mold includes separable A side 76a and B side 76b, respectively, which collectively form a cavity for receiving the motor and a plastic material to be molded over the body portion of the motor. The A side of the mold fits tightly against the rear face 42r of the flange 42 and serves to shut off the flow of molding material. The boundaries of the casing formed by the molding material are defined by the cavity in the A side 76A, the outer surface of the body portion of the housing, and the rear face 42r of the flange 42. Utilizing the rear face 42r for this purpose not only simplifies the mold but, by virtue of the casing extending up to the flange face, it lessens the likelihood that contaminants will find their way around the end of the casing and into the housing junctions covered by the molding material.

A preferred molding material is a plastic material which retains its integrity over the full range of operating temperatures to which the motor is exposed. Of particular usefulness for automotive applications are reinforced thermoplastic polyester resins such as polyethylene terephthalates. One such material which has been used successfully in automotive applications is a glass-filled polyethylene terephthalate resin sold by E.I. DU PONT DE NEMOURS & CO. under the tradename RYNITE 530. This same material may be advantageously used for the terminal barrier 60.

During the molding process, an injection nozzle 78 is inserted into a sprue bushing 80 and molten molding material is injected, under pressure, into a sprue 82 of the mold. The injection pressure utilized is primarily dependent on the dimensions of the casing volume to be filled with the molding material. The pressure should be high enough to ensure filling of this volume, but not so high as to cause deformation of the housing. Because of the force fit of the end cover rims 19f and 16r around the stator shroud lips 14f and 14r, and the relatively large molecular sizes of the molding material components, no significant leakage of the molding material into the housing occurs at these two junctions.

After the injected molding material cools sufficiently to shrink away from contact with the inner surfaces of the A side of the mold (typically a period of 30 seconds to one minute for the RYNITE 530 resin), the A and B sides of the mold are separated and the motor is ejected from the B side of the mold. This ejection is effected by a pair of pins 84 which are slidably disposed in the B side of the mold and driven by an ejector plate 86. The shrinkage of the casing material also forces it tightly against rear and bottom sidewalls 74a and 74b, respectively, of the annular channel 74, further improving the seal.

We claim:

1. A substantially sealed electric motor comprising:
   a. an electromechanical assembly including a stator, a plurality of windings, and a rotor electromagnetically coupled to the windings and the stator and mounted for rotation relative to the stator in response to application of an electrical current to the windings;
   b. electrical connection means facilitating external electrical connection to the windings;
   c. a shaft driven by the rotor and accessible externally of the motor, said shaft having a longitudinal axis; and
   d. a substantially closed housing having a plurality of separable parts, said housing substantially enclosing the electromechanical assembly and including:
      (1) a drive portion having an opening through which a length of the shaft extends out of the housing; and
      (2) a body portion adjacent the drive portion and extending around a distal end of the electromechanical assembly, said body portion including at least one junction between said separable parts, said body portion and each said junction being substantially impervious to a predetermined molding material;
   a casing comprising said predetermined material molded over a substantial area of the body portion which includes each said at least one junction; and
   at least one irregularity in an outer surface of the housing, to which an inner surface of the molded casing conforms, for retaining the casing on said housing.

2. A substantially sealed electric motor as in claim 1 where the casing is injection molded over said substantial area of the body portion.

3. A substantially sealed electric motor as in claim 1 or 2 where the casing is molded over substantially the entire body portion.

4. A substantially sealed electric motor as in claim 1 or 2 wherein the drive portion has a flange with a face that extends transversely from an outer surface of the housing an circumvents the longitudinal axis of the shaft where an end of the casing abuts the flange face.

5. A substantially sealed electric motor as in claim 4 where the at least one irregularity comprises an indentation in the body portion of the housing.

6. A substantially sealed electric motor as in claim 5 where the indentation in the body portion comprises an annular channel circumventing the longitudinal axis of the shaft.

7. A substantially sealed electric motor as in claim 6 where the annular channel is disposed between the flange face and the at least one junction which is closest to said flange face.

8. A substantially sealed electric motor as in claim 7 where the annular channel is disposed immediately adjacent the flange face.

9. A substantially sealed electric motor as in claim 4 where the flange is an integral part of the drive portion.

10. A substantially sealed electric motor as in claim 1 or 2 where the housing comprises a material which has a coefficient of expansion that is different than the predetermined casing material coefficient of expansion.

11. A substantially sealed electric motor as in claim 10 where the housing comprises a metallic material and the casing comprises a plastic material.

12. A substantially sealed electric motor as in claim 1 or 2 where the housing includes at least one opening for the electrical connection means and where said means comprises:
   a. circuit board means disposed within the housing and having a plurality of conductive tracks electrically connected to the windings;
   b. a plurality of conductive terminals attached to said circuit board means and electrically connected to respective ones of said tracks, said terminals extending through the at least one opening in the housing; and
   c. a connector of insulating material integrally molded as part of the casing, said connector being molded around the terminals where they extend out of the housing.

13. A substantially sealed electric motor as in claim 12 including terminal barrier means for substantially closing areas of the at least one opening which are not occupied by the terminals extending through said at least one opening.

14. A substantially sealed electric motor as in claim 13 where the terminal barrier means includes a plate-shaped portion for covering the at least one opening and at least one plug portion extending into said at least one opening and surrounding lengths of the terminals disposed in said at least one opening.

15. A substantially sealed electric motor as in claim 1 or 2 where said motor is a stepper motor.

16. A substantially sealed electric motor comprising:
   a. an electromechanical assembly including a stator, a plurality of windings, and a rotor electromagnetically coupled to the windings and the stator and mounted for rotation relative to the stator in response to the application of an electrical current to the windings;
   b. a shaft driven by the rotor and accessible externally of the motor, said shaft having a longitudinal axis;
   c. a substantially closed housing having a plurality of separable parts including:
      (1) a tubular member disposed around the stator;
      (2) a first end cover attached to a first end of the tubular member at a first junction for substantially closing said first end, said first junction being substantially impervious to a predetermined molding material; and (3) a second end cover attached to a second end of the tubular member at a second junction for substantially closing said second end, said second junction being substantially impervious to the predetermined molding material, and said second end cover including:

(a) an axially extending portion having an outer surface with a radially inwardly directed channel circumventing the longitudinal axis of the shaft;

(b) a flange including a face extending transversely from the outer surface adjacent the channel and circumventing the longitudinal axis of the shaft; and (c) an end surface having an opening through which the shaft extends out of the motor;

d. a casing comprising said predetermined material molded over the first end cover, the tubular member and that portion of the second end cover extending from the second end of the tubular member to the flange face, said over molded casing extending into the channel; and e. electrical connection means facilitating external electrical connection to the windings.

17. A substantially sealed electric motor as in claim 16 where the casing is injection molded.

18. A substantially sealed electric motor as in claim 16 where said outer surface of the axially extending portion of the second end cover is cylindrical.

19. A substantially sealed electric motor as in claim 16 where the channel is disposed immediately adjacent the flange face.

20. A substantially sealed electric motor as in claim 16 where the flange is an integral part of the second end cover.

21. A substantially sealed electric motor as in claim 16 where the tubular member, the first end cover, and the second end cover comprise respective materials which have coefficients of expansion that are different than the casing material coefficient of expansion.

22. A substantially sealed electric motor as in claim 21 where the tubular member, the first end cover, and the second end cover comprise respective metallic materials and where the casing comprises a plastic material.

23. A substantially sealed electric motor as in claim 22 where the first and second end covers comprise aluminum.

24. A substantially sealed electric motor as in claim 23 where the tubular member comprises cold-rolled steel.

25. A substantially sealed electric motor as in claim 16 where each of said first and second junctions is formed by mating annular members, one of said members in each junction surrounding the other.

26. A substantially sealed electric motor as in claim 25 where:

a. the mating annular members forming the first junction comprise a rim at an end of the first end cover and a lip at the first end of the tubular member; and b. the mating annular members forming the second junction comprise a rim at an end of the second cover and a lip at the second end of the tubular member.

27. A substantially sealed electric motor as in claim 16 where one of the tubular member, the first end cover, and the second end cover includes at least one opening for the electrical connection means and where said means comprises:

a. circuit board means disposed adjacent the stator and having a plurality of conductive tracks electrically connected to the windings;

b. a plurality of conductive terminals attached to said circuit board means and electrically connected to respective ones of said tracks, said terminals extending through the at least one opening for the electrical connection means; and c. a connector of insulating material integrally molded as part of the casing, said connector being molded around the terminals where they extend through the at least one opening.

28. A substantially sealed electric motor as in claim 27 including terminal barrier means for substantially closing areas of the at least one opening which are not occupied by the terminals extending through said at least one opening.

29. A substantially sealed electric motor as in claim 28 where the terminal barrier means includes a plate-shaped portion for covering the at least one opening and at least one plug portion extending into said at least one opening and surrounding lengths of the terminals disposed in said at least one opening.

30. A substantially sealed electric motor as in claim 27 where the at least one opening is in the first end cover.

31. A substantially sealed electric motor as in claim 16 where said motor is a stepper motor.

* * * * *